April 22, 1924.
D. W. UBER
MEASURING APPARATUS
Filed Oct. 30, 1922
1,491,446
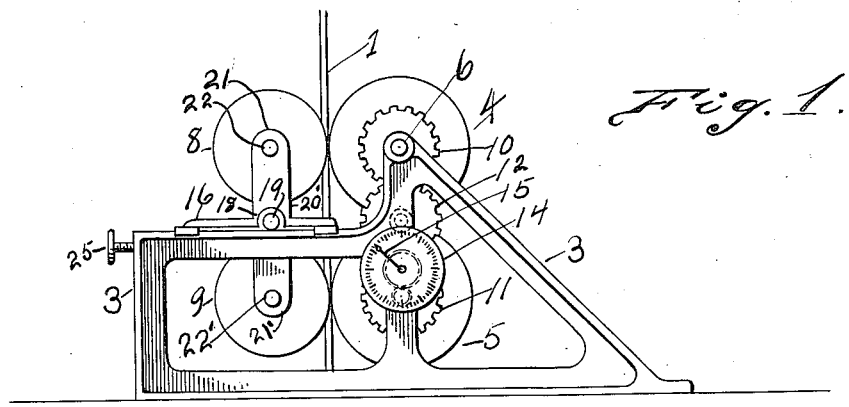
Fig. 1.
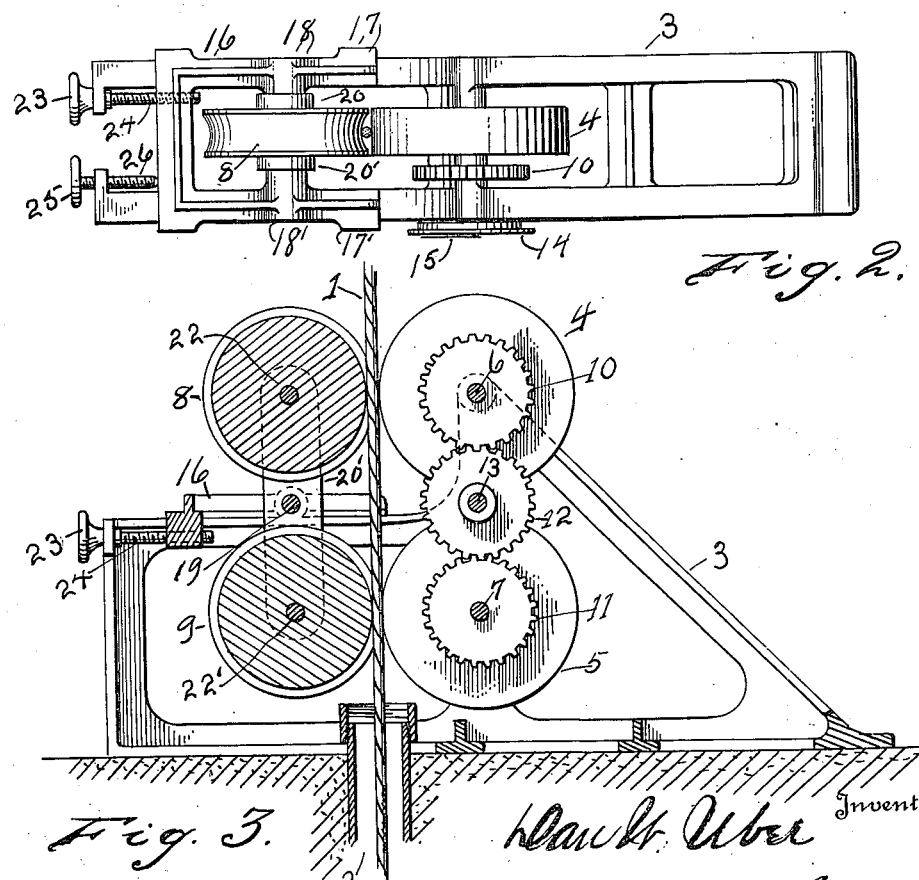
Fig. 2.
Fig. 3.
David W. Uber, Inventor
By Adrian Siger, Attorney Patented Apr. 22, 1924.

1,491,446

UNITED STATES PATENT OFFICE.

DAN W. UBER, OF SHEFFIELD, PENNSYLVANIA, ASSIGNOR TO MOSER MANUFACTURING COMPANY, OF KANE, PENNSYLVANIA, A CORPORATION OF PENNSYLVANIA.

MEASURING APPARATUS.

Application filed October 30, 1922. Serial No. 597,803.

*To all whom it may concern:*

Be it known that I, DAN W. UBER, a citizen of the United States, residing at Sheffield, in the county of Warren and State of Pennsylvania, have invented certain new and useful Improvements in Measuring Apparatus, of which the following is a specification.

This invention relates to new and useful improvements in measuring devices, and the present invention comprises an improvement over that shown in U. S. Letters Patent No. 1,228,991, granted to me on June 5, 1917.

The invention has particularly to do with measuring devices for use in ascertaining the depth of oil wells and the like, and involves revolving measuring elements coacting with the cable which is lowered into the well and operating a register whereby each foot of travel of the cable downward is indicated.

The object of this invention is to provide a device which will induce greater accuracy of measurement by eliminating the slippage of the cable in its contact with the measuring means.

With the above and other objects in view, the invention consists in the novel construction and arrangement of the parts to be hereinafter more fully described and claimed, reference being had to the accompanying drawings in which the preferred embodiment of the invention is shown, and wherein:

Fig. 1 is a side elevation of my improved apparatus,

Fig. 2 is a plan view, and

Fig. 3 is a sectional elevation.

In the drawings the numeral 1 designates the rope or cable being lowered into the well 2. The supporting frame of the apparatus is designated by the numeral 3. Located within the supporting frame are the operating wheels 4 and 5, mounted upon the shafts 6 and 7 respectively, which are suitably journaled in the frame 3.

The wheels 4 and 5 have equal circumferential measurement, with their peripheral surfaces in the form of a section of a true cylinder, and are adapted to rotate in the same direction, and at the same rate of rotation. This is accomplished by intermeshing gearing comprising the spur gear wheels 10 and 11, mounted on the shafts 6 and 7 respectively. Located intermediate of the spur gear wheels 10 and 11, and meshing therewith is the idler spur gear wheel 12, mounted for rotative movement on the stub shaft 13, which is rigidly mounted on the frame 3, in the same vertical plane as the shafts 6 and 7. The spur gear wheels 10, 11 and 12, are of equal diameter and pitch, by which an equal speed of rotation of the wheels 4 and 5 is obtained.

In carrying out the principal features of this invention, I locate on the horizontal portion of the frame 3, a sliding member in the form of a yoke 16, adapted for movement in a horizontal plane. Located on the arms 17 and 17' of the yoke 16, are the journals 18 and 18'. Mounted for oscillating movement in the journals 18 and 18' is the shaft 19. The shaft 19 projects centrally through an equalizing cable contact member comprising two parallel disposed bars 20 and 20'. Each of the ends 21 and 21' of the bars are connected by the stub shafts 22 and 22'.

The bars 20 and 20' are spaced apart to allow for the mounting interposed therebetween, of the wheels 8 and 9 on the stub shafts 22 and 22', for rotative movement. The wheels 8 and 9 have grooved peripheries and are adapted to be placed in rolling contact with the cable 1, and to maintain the cable in registering contact with the peripheries of the wheels 4 and 5.

The equalizing member above described, and the resulting effect of its functions form important features of this invention, as will be more fully explained.

It has been found from experience, that where the cable is deflected from a medial line in its maintained contact with the measuring means, that errors of measurement occurred.

This error of measurement has been practically eliminated by the use of the equalizing member shown, in using two cable contacting wheels, engaging the cable at the exact centres of the perimeters of the registering wheels 4 and 5.

To accomplish this, the axis of the wheels 4 and 8, and the axis of the wheels 5 and 9, are located in the same horizontal planes respectively.

A further advantage found to reside in the above described equalizing member, is the elimination of the effect of weaving or snapping of the cable from side to side when passing through the measuring device, as any variations from the medial line by the cable, at its entrance or interposition between the peripheries of the first cable engaging pair of wheels, will have been eliminated at the point of engagement of the cable with the succeeding pair of wheels, and the cable will pass therebetween in its true position for correct measuring.

To maintain the cable engaging wheels in suitable contact with the cable, I provide for the movement of the yoke 16 in a horizontal plane, by the operation of the hand wheel 23 mounted on the screw 24, which has a threaded engagement with the base of the yoke 16. For locking the yoke 16 in a fixed position I provide the hand wheel 25 operating the screw 26 the inner end of which has a bearing contact with the base of the yoke 16.

For the purposes of registering the number of feet of cable travel I provide a form of indicator 14, which may be of the usual construction, provided with a dial and an indicator hand 15, operatively connected with, and rotated by, the movement of the cable registering wheels 4 and 5.

Operation: In the operation of this device, the yoke 16 is moved to recede the wheels 8 and 9 from the wheels 4 and 5 sufficiently to allow the sand bailer to be lowered therebetween, and into the mouth of the well.

The yoke 16 is then set up to cause the cable 1 above the bailer to be gripped between the wheels 4 and 8 and 5 and 9, to a degree necessary to accomplish the registering. The sand bailer is then lowered in the usual way, and the sand line attached thereto, being yieldingly held against the periphery of the wheels 4 and 5, causes them to rotate and to register their rotations on the dial indicator 14, by hand 15, the rotation of which can be readily counted as the cable is being lowered, until the sand bailer has reached the bottom of the well.

By the arrangement of the equalizing member, it will be apparent to those skilled in the art, that should any enlargement such as a splice or the projecting end of a broken strand in the rope occur, that the yielding provision of the equalizer provided for by the oscillating movement on the shaft 19, will allow for a separation of the peripheries of the first pair of cable engaging wheels, sufficient for the passage therebetween of the enlargement on the cable, coincident therewith, will be a correspondingly closer and more effective contact with the cable, of the peripheries of the other cable engaging wheels, through the same oscillating movement of the equalizer. This movement will tend to stabalize the registering during the period of passage of any irregularity in the surface of the cable, past the cable engaging wheels.

Other advantages of the invention will become obvious to those skilled in the art, and in the application thereof it will be observed that various changes may be made in the details of construction without departing from the spirit of my invention.

Having fully described my invention what I claim as new, and desire to secure by Letters Patent, is:

1. A well measuring device comprising a pair of rotatable members axially mounted in a vertical plane, operatively connected to actuate a registering indicator, a companion pair of rotating members oscillatingly mounted on a mutual pivot, and means for conveying movement to the pivot to place the peripheries of the oscillatingly mounted members in contiguous relation with the peripheries of the operatively connected members on a horizontal plane common to the axes of the contiguously placed members.

2. An apparatus of the character described, comprising a portable supporting frame, a pair of operatively connected rotatable members mounted with their axes in vertical alignment on said frame, a companion pair of rotatable members mounted on said frame in a position opposed to, and in axial alignment horizontally with said operatively connected rotatable members, and means for varying the distance between the opposed rotatable members.

3. A well measuring device comprising a frame supporting an upper and lower cable engaging pulley axially mounted in a vertical plane, a companion pair of vertically disposed upper and lower pulleys mounted for oscillating movement on a mutual pivot, means for conveying horizontal movement to said pivot whereby the juxtaposed peripheries of the upper and lower contiguous pulleys will engage a cable interposed therebetween at a point, in a horizontal plane common to the axis of the contiguous pulleys.

4. In combination with a pair of vertically disposed operatively connected cable contact measuring wheels, of a cable engaging equalizing member comprising bearing plates mounted for oscillating movement on a shaft, cable engaging pulleys mounted in said bearing plates on each side of the shaft and in the same plane therewith, and means for conveying horizontal movement to said shaft to force a cable into driving contact with said measuring wheels.

5. An apparatus of the character described, comprising a frame, rotating disks mounted in said frame in two vertically disposed series, the disks of the one series having fixed axes in said frame, the disks of the other series being mounted at each end of an equalizing yoke member centrally pivoted for oscillating movement adapting the disks mounted thereon to be compensatingly moved in opposite directions and horizontally moved in unison, to cooperate with the other series to form an operative rolling contact with a cable interposed between the cooperating disks.

6. An apparatus of the character described comprising a frame, rotatable disks mounted in said frame in two cooperative vertically disposed series, the disks of the one series having fixed axes in said frame, the disks of the other series being adapted to form a gripping engagement with a cable interposed between the peripheries of the cooperating disks and adapted to be compensatingly moved in opposite directions to induce an alternate yielding and constricting gripping of the cable substantially as described.

7. A well measuring device comprising a frame, rotatable disks mounted on said frame in two vertically disposed series, the disks of the one series having fixed axes and formed with flat peripheries, the disks of the other series having grooved peripheries and movable axes, the upper and lower companion disks of each series being positioned to place their peripheries in contiguous relation on a plane common to the axes of both companion disks, and means to provide an alternate constricting and yielding contact of the peripheries of each companion disks upon a cable interposed therebetween.

8. An apparatus of the character described comprising a frame, rotatable disks mounted on said frame in two vertically disposed series, the disks of the one series having fixed axes, the disks of the other series being mounted at each end of an equalizing yoke member centrally pivoted for oscillating movement and adapted for horizontal movement in unison, the upper and lower companion disks of each series being positioned to place their peripheries in contiguous relation on a plane common to the axes of both companion disks and to form a rolling contact with a cable interposed therebetween.

In testimony whereof I have affixed my signature.

DAN W. UBER.